United States Patent [19]

Hamilton

[11] Patent Number: 4,708,550

[45] Date of Patent: Nov. 24, 1987

[54] RESISTANCE BETWEEN NUT AND BOLT

[75] Inventor: Richard J. W. Hamilton, Adamstown Heights, Australia

[73] Assignee: The Titan Manufacturing Co. Pty. Ltd., Mayfield, Australia

[21] Appl. No.: 320,796

[22] Filed: Nov. 12, 1981

[30] Foreign Application Priority Data

Nov. 18, 1980 [AU] Australia .................. PE6531

[51] Int. Cl.⁴ .................. F16B 31/00; F16B 33/04
[52] U.S. Cl. .................. 411/3; 411/9; 411/373; 405/261
[58] Field of Search .................. 411/2–10, 411/40, 41, 295, 302, 369, 373, 907, 908, 910; 405/259, 260, 261; 220/235, 237, 238

[56] References Cited

U.S. PATENT DOCUMENTS

| | | | |
|---|---|---|---|
| 1,528,185 | 3/1925 | Diederick | 220/237 |
| 2,956,468 | 10/1960 | Macy | 411/41 |
| 3,365,093 | 1/1968 | Malenke | 220/235 |
| 4,295,761 | 10/1981 | Hansen | 405/260 |
| 4,303,354 | 12/1981 | McDowell, Jr. | 405/260 |
| 4,347,020 | 8/1982 | White et al. | 405/260 |

FOREIGN PATENT DOCUMENTS

| | | | |
|---|---|---|---|
| 5022469 | 8/1970 | Australia . | |
| 487898 | 1/1975 | Australia | 405/260 |
| B7444681 | 2/1982 | Australia . | |
| 8156382 | 3/1982 | Australia . | |
| 85482 | 4/1985 | Australia . | |
| 85483 | 4/1985 | Australia . | |
| 1484229 | 1/1969 | Fed. Rep. of Germany . | |
| 3145923A1 | 6/1983 | Fed. Rep. of Germany . | |
| 1355463 | 2/1964 | France | 411/41 |
| 2252033 | 6/1975 | France | 411/3 |
| 1269471 | 10/1969 | United Kingdom . | |

*Primary Examiner*—Neill Wilson
*Attorney, Agent, or Firm*—Murray and Whisenhunt

[57] ABSTRACT

A nut in combination with a deformable plastic plug is provided so as to produce a torsional reistance when the nut is screwed onto a similar male thread such as a bolt. The plug comprises an inner core wedge and an outer sleeve which will expand upon insertion of the core. The sleeve is placed into the nut, leaving at least one complete turn of the thread free, and the core is wedged into the sleeve forcing it to deform into the thread.

10 Claims, 3 Drawing Figures

RESISTANCE BETWEEN NUT AND BOLT

This invention relates to resistance between nuts and bolts and has been devised to provide a predetermined resistance to rotation between a nut and a bolt. One application is in the area of rockbolts or roof bolts, to provide a predetermined resistance to rotation during the initial mining phase of installation.

Rock bolts are commonly installed in holes drilled in a rock or coal face by inserting a capsule containing resin bonding ingredients within the hole, inserting the rock bolt so as to break the capsule with the end of the bolt, rotating the rock bolt so as to thoroughly mix the resin or other ingredients, holding the rock bolt while the resin sets and then tightening the nut generally to a plate washer on the exposed end of the rockbolt. In the past rotation of the rock bolt to achieve mixing of the resin components has normally been performed by engaging a suitable tool with a squared end on the rock bolt. This system has the disadvantage that the rock bolt must be provided with a suitable squared end which increases the manufacturing costs and furthermore a separate tool must be used on site to engage with the squared end and rotate the rock bolt. Various attempts to overcome this problem have been proposed including that described in our Australian Pat. No. 487989 corresponding to U.S. Pat. No. 3,979,918 wherein a crimped deformation is placed at one open end of the nut so that there is a resistance to rotation between the nut and the rock bolt when the nut is first engaged with the rock bolt. With this system the normal nut tightening machinery can be used to rotate the rock bolt by rotating the nut, making use of the resistance to rotation between the nut and the bolt provided by the crimped end on the nut. The resistance to rotation is operative up to a certain torque value after which the obstruction was "displaced" and the nut could be rotated over the threads on the bolt and hence advance up the bolt.

The method of operation described in Australian Pat. No. 487898 has the disadvantage that there is considerable inconsistency of operation due to tolerancing of both nut and bolt threads and that after the resistance between the nut and bolt is exceeded by application of a higher torque, a frictional drag is still evident which leads to uncertainty in the effectiveness of the installation. Damage to the bolt thread may also result, preventing subsequent use of such bolt in co-operation with another nut or the like.

It is therefore an object of the present invention to provide a resistance between a nut and bolt which will obviate or minimise the foregoing disadvantages in a simple yet effective manner or which will at least provide the public with a useful choice.

Accordingly in one aspect the invention may broadly be said to consist in a nut and bolt assembly wherein the nut is provided with resistance means arranged such that when the nut is partially engaged with the bolt, a predetermined resistance to relative rotation between said nut and said bolt is provided until said nut is fully engaged with said bolt whereupon said resistance means is expelled from said nut.

In a further aspect the invention may broadly be said to consist in a nut incorporating resistance means in the form of a plug internally engaged with part of the thread of the nut leaving at least one full turn of the thread at one end of the nut free or exposed, said plug being engaged with said thread so as to provide resistance to the further rotation of a bolt engaged with the free turn or turns of thread and advanced in the nut until the end of the bolt abuts the plug.

Preferably said resistance means comprise a plug of plastics material internally engaged with part of the thread of the nut.

Preferably said plug comprises an outer sleeve and an inner core having a wedge action profile therebetween so that the sleeve may be inserted within the thread of the nut and expanded outwardly by driving the core into the sleeve and expanding the sleeve outwardly by the wedge action.

Preferably said core and said sleeve are moulded in one piece from a suitable plastics material and are connected together by a frangible link which is broken when said core is driven into said sleeve.

Preferably said sleeve is provided with a longitudinal split therein to permit radial expansion under the wedging action of the core.

Preferably said plug is of a deformable plastics material which deforms into and engages with the thread form of the nut during expansion.

Notwithstanding any other forms that may fall within its scope, one preferred form of the invention will now be described with reference to the accompanying drawings, in which.

Figure 1:
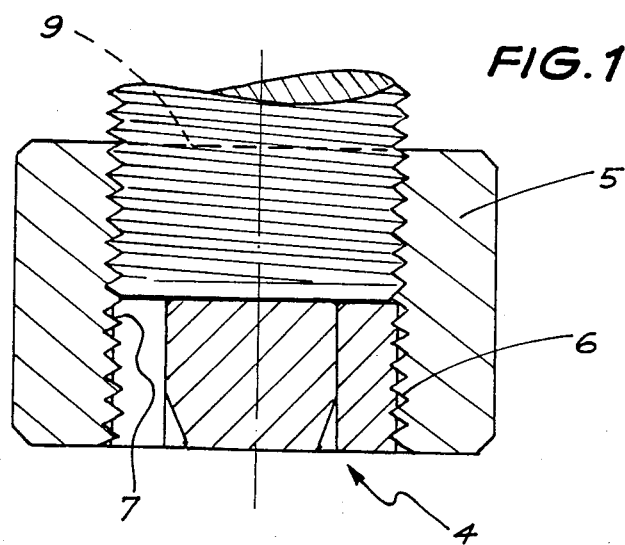
FIG. 1 is a partial cross-sectional elevation of a nut and bolt assembly according to a preferred form of the present invention.

In the preferred form of the invention, a nut to be used with a nut and bolt assembly according to the invention is constructed as follows:

The nut 5 is provided with resistance means in the form of a plug 4 which is internally engaged with part of the thread of the nut leaving at least one full turn of the thread at one end 9 of the nut free or exposed. In the preferred form of the invention as shown in FIG. 1, the plug is engaged with approximately half the thread of the nut although other proportions of the thread may be engaged by the plug and still enable satisfactory performance of the invenion.

Figure 3:
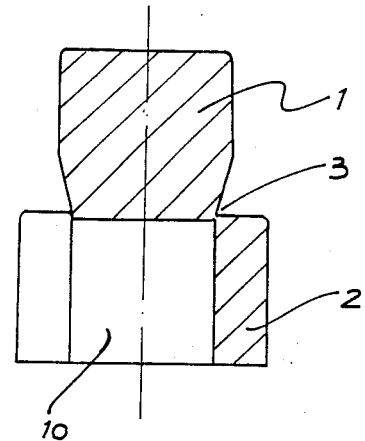
FIG. 3 is a cross-sectional view on the line A—A of FIG. 2.
Figure 2:
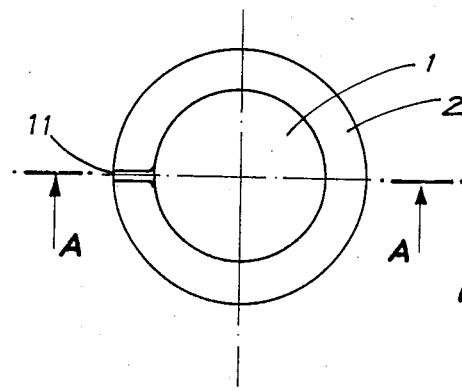
FIG. 2 is a plan view of the plug before insertion into the nut shown in FIG. 1.

The plug is moulded from plastics material to a form as shown in FIGS. 2 and 3 comprising a core 1 and a sleeve 2 moulded together and connected by one or more frangible links 3. A wedge configuration is provided between the core and the sleeve. In the preferred form of the invention the wedge configuration is provided by tapering the core at the end portion which first enters the sleeve, the remainder of the core being parallel sided, as shown in FIG. 3. The sleeve, which has a smooth, unthreaded external surface, is provided with a parallel sided aperture 10 therein. It will be appreciated that the wedging action may be provided in other ways, for example, the core may be parallel sided and the aperture 10 may have tapered sides or alternatively both the core and aperture may be tapered in configuration. The core may also be tapered over its entire length.

The sleeve, in its preferred form, is provided with a slit 11 over the length of the sleeve so that it can be radially expanded when the core is driven into the sleeve. In another form the sleeve may be provided with multiple slits. Altenatively the sleeve may be without any slits so that when expanded, by the core being driven into the sleeve, it will fracture or stretch. During manufacture, the unit as shown in FIGS. 2 and 3 is placed within the threaded portion of the nut 5, the sleeve being sized so that it will fit neatly within the thread form of the nut. Once the component is in place the core 1 is driven into the sleeve 2 causing the sleeve to expand outwardly and form a plug 4 which is firmly engaged with the thread form 6 of the nut. The outer wall of the sleeve is deformed as shown at 7 to engage with the thread form so that the plug is firmly engaged with the nut.

In an alternative embodiment of the plug a flange (not shown) may be provided towards the free end of the core initially remote from the sleeve prior to the core driving operation, so that during the core driving operation the flange prevents over-driving of the core into the sleeve in the event that a relatively small diameter driving member is used.

In use the nut is threaded onto the end of a bolt such as a rock bolt so that the threaded end of the rock bolt engages firstly with the open end 9 of the nut. A plate washer or any other form of washer may be engaged with the rock bolt before placement of the nut. To install the rock bolt in a hole, the bolt is inserted into the hole with a medium requiring mixing, or a resin-mix capsule as is conventionally known. The capsule is broken by the bolt. The nut is engaged with a suitable machine to rotate the nut in the normal manner and to simultaneously thrust the bolt into the hole. The nut and bolt are by this stage engaged as shown in FIG. 1 and due to the resistance provided by the plug 4, the bolt is also rotated causing the resin mixture to be thoroughly mixed at the end of the bolt. Rotation is then stopped for a predetermined period to allow the resin mixture to set. The nut is then rotated again and as the rock bolt is now held fixed within the hole, the nut is rotated relative to the bolt against the resistance of the plug 4 until the plug is expelled from the end of the nut. Rotation of the nut may then be continued to tighten the nut against the plate washer or similar and effectively secure the rock face.

In this manner a nut and bolt assembly is provided which enables the fast and economic installation of a rock bolt and which enables the nut to finally be tightened to a predetermined torque against the plate washer without final interference from the resistance means during the tightening phase of the nut engagement.

What I claim is:

1. A nut having a threaded bore extending therethrough, said threaded bore having a single thread therein, a plug at least partly located within said bore leaving at least one full turn of the thread at one end of the bore exposed, said plug having a plurality of portions, one portion being an outer sleeve means and another portion being an inner core means, said sleeve means and said core means having a wedge action profile therebetween for expanding the sleeve means against the threaded interior of the nut by the core means being driven into the sleeve means to expand the sleeve means to provide resistance to relative rotation of a bolt threadedly engaged with the nut and abutting the plug until a predetermined torque has been reached, whereupon the plug is expelled from the nut and relative rotation of the bolt and the nut can further occur.

2. A nut as defined in claim 1 wherein said plug is of a deformable plastics material which deforms into and engages with the thread form of the nut during said expansion.

3. A nut as defined in claim 2 wherein said outer sleeve and inner core are moulded in one piece and connected together by a frangible link which is broken when said core is driven into said sleeve to expand said sleeve by the wedge action.

4. A nut as defined in claim 3 wherein said sleeve is provided with a longitudinal slit therein to permit radial expansion under the wedging action of the core.

5. A nut as defined in claim 1 wherein said plurality of portions include an outer sleeve having an external surface which engages with part of the thread of said nut, said external surface being unthreaded prior to insertion into said nut.

6. A nut as defined in claim 1, wherein at least that portion of the core which first enters said sleeve is tapered.

7. An assembly of a rock bolt and a nut mounted thereon in threaded engagement therewith, said rock bolt being threaded on at least one end thereof, said nut having an internal thread which is engageable with the bolt thread, with the thread of the nut which the bolt first contacts upon threaded engagement thereof being the same as the thread the end of the bolt last contacts upon the end of the bolt passing through the nut, said assembly including a plug located within said nut and including an outer sleeve means and an inner core means having a wedge action profile therebetween for expanding the outer sleeve means against the threaded interior of the nut by the core means being driven into the sleeve means to expand the sleeve means to provide resistance to the further rotation of a bolt engaged with the nut and advanced therein until the end of the bolt abuts the plug until a predetermined torque has been reached, whereupon the plug is expelled from the nut and further rotation of the nut on the bolt can occur.

8. An assembly as defined in claim 7 wherein said plug is of a deformable plastics material which deforms into and engages with the thread form of the nut during said expansion.

9. An assembly as defined in claim 8 wherein said outer sleeve and inner core are moulded in one piece and connected together by a frangible link which is broken when said core is driven into said sleeve to expand said sleeve by the wedge action.

10. An assembly as defined in claim 9 wherein said sleeve is provided with a longitudinal slit therein to permit radial expansion under the wedging action of the core.

* * * * *